US005419129A

United States Patent [19]

Becker et al.

[11] Patent Number: 5,419,129

[45] Date of Patent: May 30, 1995

[54] HYDRAULIC SYSTEM FOR OPEN OR CLOSED-CENTERED SYSTEMS

[75] Inventors: Manfred Becker, Frankenthal; Hilmar Ortlepp, Mannheim, both of Germany

[73] Assignee: Deere & Company, Moline, Ill.

[21] Appl. No.: 215,842

[22] Filed: Mar. 22, 1994

[30] Foreign Application Priority Data

Apr. 5, 1993 [DE] Germany ........................ 43 11 191.2

[51] Int. Cl.[6] ........................ F16D 31/02
[52] U.S. Cl. ........................ 60/452
[58] Field of Search ........................ 60/452; 91/432

[56] References Cited

U.S. PATENT DOCUMENTS

| | | | |
|---|---|---|---|
| 3,865,013 | 2/1975 | Mastaj | 91/432 |
| 4,821,514 | 4/1989 | Schmidt et al. | 60/452 |
| 4,938,023 | 7/1990 | Yoshino | 60/420 |
| 5,245,827 | 9/1993 | Durant et al. | |
| 5,259,192 | 11/1993 | Karakama et al. | 60/426 |

FOREIGN PATENT DOCUMENTS 3522450 1/1987 Germany .

OTHER PUBLICATIONS

Mollo, J. R., "Load-Sensing Pumps: has their time come?", Hydraulics and Pneumatics, Jul. 1990, pp. 91, 92 and 94.

(AS) Olyhydraulic und Pneumatic, "Nutzbare Leistung einer LS-Hydraulic", Apr. 1992, No. 4, pp. 234, 237-241.

(AT) Olyhydraulic und Pneumatic, "Hydraulik in Tractoren und Landmaschinen—Neus von der Agritechnica '91", Mar. 1992, No. 3, pp. 139, 140, 143-147.

*Primary Examiner*—F. Daniel Lopez

[57] ABSTRACT

A hydraulic system includes a hydraulic pump, a reservoir, a hydraulic function, such as a cylinder, and a power beyond valve for controlling communication between the pump, the reservoir and the cylinder. The pump provides pressurized fluid at a pump output as a function of the pressure in a load sensing port. For generating a pump controlling load sensing signal in case that the cylinder does not generate such a signal, it is proposed to provide a valve which blocks in a first position or opens in a second position communication between the feed line of the cylinder and the load sensing port of the pump. The valve functions in dependence of control pressures acting on each side of a valve member. A spring is provided biased to urge the valve member to its first closed position. Further, shift valve means are provided to supply selectively different pressures to both sides of the valve member. In an open-center hydraulic system, the valve means the shift valve means connects the first side of the valve member to the reservoir and the second side of the valve member to the feed line. In a closed-center system, the shift valve means will be changed over to connect the first side of the valve member to the feed line and the second side of the valve member to the pump outlet.

13 Claims, 3 Drawing Sheets

HYDRAULIC SYSTEM FOR OPEN OR CLOSED-CENTERED SYSTEMS

BACKGROUND OF THE INVENTION

The invention relates to a hydraulic system with an adjustable hydraulic pump, whose output pressure can be controlled as a function of the pressure existing at a load sensing connection, a reservoir, at least one hydraulic device with a supply line and a valve arrangement between the pump, the reservoir and the device.

Modern agricultural tractors are today equipped with constant pressure hydraulic systems in which control valves block the flow of fluid from the pump when they are in their neutral position (closed-center-system). Furthermore, in these systems the hydraulic fluid output can be compensated in such a way that only the necessary flow of fluid is delivered by the pump (power-on-demand). The significant feature of such systems is the so-called load sensing line from the device to the load sensing connection of the hydraulic pump, by means of which the hydraulic pump adjusts its output pressure at all times as a function of the pressure existing at the load sensing connection and thereby provides only the necessary supply. This permits a considerable saving in energy.

The attached implements used in agriculture are primarily equipped with self-contained control devices for the control of their hydraulic systems. In order to avoid a costly double actuation by the tractor-borne control device and the control device on the side of the attached implement it would be advantageous if the latter could be connected directly to the tractor-borne hydraulic system without any supplementary procedures. However, since the hydraulic controls on the side of the attached implements are most frequently configured as constant flow valves, that are open in their center position (open-center-design) or as constant pressure valves that are closed in their center position (closed-center-design), they are not always provided with the necessary load sensing connection. If, for example, a control valve of the aforementioned tractor hydraulic system is used, in order to control the fluid flow to the hydraulic devices of an attached implement which requires a constant pressure supply, then the hydraulic pump of the tractor must be operated continuously at the maximum operating pressure. This results in power losses greater than necessary. Consequently, the fuel consumption also increases, and additional heat loading is imposed.

A solution to this problem could be provided by installing a hydraulic load sensing line on the attached implement, which detects the hydraulic pressure of the device on the attached implement and transmits this to the load sensing connection of the tractor-borne hydraulic pump. However, this solution requires changes to the hydraulic system of the attached implement (hydraulic circuits and valve arrangement), which can become very costly and complicated, if several devices must be considered.

Another solution requires the use of sets of valves, which are usually supplied with attached implements with constant pressure hydraulic systems in order to be able to connect these to tractors with constant flow hydraulic systems. In such a set of valves an electric control signal from the attached implement is utilized in order to control a relief valve of the set of valves. In this method of operation the operator must carefully adjust the tractor valve which delivers the hydraulic fluid, in order to minimize power losses. But, even with such an adjustment the uninterrupted fluid flow is maintained, if the device of the attached implement is not actuated, which results in undesirable power losses.

SUMMARY OF THE INVENTION

Accordingly, an object of this invention is to provide a simple and effective interface between various devices on attached implements and a load sensing hydraulic system with a compensated fluid flow, in which the hydraulic pump pressure is limited to the amount required.

A further object of the invention is to provide such a such a system which does not require any extensive hydraulic installation work or valve modifications.

Another object of the invention is to provide an interface which obtains a load sensing signal with the use of various devices on attached implements, by means of which the hydraulic pump can be controlled.

These and other objects are achieved by the present invention, wherein a valve arrangement is provided between the hydraulic device and the load sensing connection of the hydraulic pump, which closes a connecting passage between the hydraulic device and the load sensing connection in a rest position and opens it in an operating position. One valve in the valve arrangement contains a valve spool which is forced into its rest position by a spring. Furthermore, the spool is subject to a differential pressure and opens the valve when the differential pressure exceeds the spring force. The pressures used to define the differential pressure will depend upon the hydraulic device used.

A load signal can be generated by such a hydraulic system for various hydraulic devices, by means of which the hydraulic pump can be controlled. This represent a simple and effective interface between hydraulic pump and hydraulic device, by means of which the output pressure of the hydraulic pump can be limited to the required degree. In order to obtain a useful load sensing signal despite a change among various different hydraulic devices, no extensive hydraulic installations or valve modifications are required.

With an open-centered system, then the spring-loaded side of the valve spool is connected to the reservoir and its other side is connected with the supply line leading to the hydraulic device. If here the control valve of the hydraulic device is in its neutral position, then the hydraulic fluid in the supply line can flow freely to the reservoir. Thereby, both sides of the control valve are connected to the reservoir and relieved of pressure, so that the valve spool, impelled by the spring force, blocks the connecting passage of the valve (between supply line and load sensing connection). Preferably, the load sensing connection is connected to the reservoir through a throttling restriction, so that the pressure existing at the load sensing connection can gradually bleed off, even when the valve is closed. Thereby, the output pressure of the hydraulic pump is controlled and reduced to the stand-by pressure.

If the control valve of the hydraulic device is moved to an operating position, then the free return flow from the supply line to the reservoir is interrupted. For the sake of this condition the pump outlet is preferably connected to the supply line through a channel containing an orifice, through which a permanent control flow is maintained. Due to this control flow the pressure in the supply line that is separated from the reservoir increases up to the pump output pressure. This pressure build-up is transmitted to the side of the valve spool opposite the spring, whereby the valve spool is moved against the force of the spring and opens the valve. When the valve is opened the pressure existing at the hydraulic device is transmitted to the load sensing connection of the hydraulic pump and provides the desired load signal to control the pump.

If the control valve of the hydraulic device is opened against a pressure from the load, then a pressure drop-off should be avoided. For this purpose a check valve is provided, preferably in the supply line, which permits a flow of fluid only from the valve to the hydraulic device, and prevents any return flow. It is appropriate that this check valve is bypassed by a throttled channel, in order to make possible a gradual bleeding-off of pressure in the supply line even when the check valve is closed, and to apply the pressure of the hydraulic device to the load sensing connection.

If the control valve is returned to its neutral position, then the supply line is again bled off to the reservoir, and the valve spool is returned by the spring force to the position in which the valve is closed. The pressure applied to the load sensing connection of the hydraulic pump is bled off through a throttling restriction to the reservoir and the output pressure of the hydraulic pump declines to the stand-by pressure.

With a closed-centered system, the spring-loaded side of the valve spool is connected to the supply line leading to the hydraulic device and the other side of the valve spool is connected to the pump outlet. Preferably, the supply line is connected to the pump outlet through a channel containing an orifice. If the control valve of the hydraulic device is in its neutral position, then the supply line is blocked. A gradual pressure equalization occurs through the channel, so that both sides of the valve spool are exposed to the output pressure of the hydraulic pump, and the valve spool is moved to its closed position by the force of the spring. Thereby, the load sensing connection is separated from the supply line. Preferably, the load sensing connection is connected to the reservoir through a throttling restriction, so that the pressure applied to the load sensing connection can be gradually bled off, even when the valve is closed. Thereby, the output pressure of the hydraulic pump is controlled and reduced to the stand-by pressure.

If the control valve of the hydraulic device is moved to an operating position, then the pressure in the supply line falls. Thereby, the pressure on the spring-loaded side of the valve spool is reduced and the valve spool is moved to its open position by the pump output pressure applied to its other side against the force of the spring. When the valve is open the pressure applied to the hydraulic device is transmitted to the load sensing connection of the hydraulic pump and provides the desired load signal to control the pump.

Preferably, a shuttle valve is provided through which the higher of the pressures at the pump outlet or the supply line can be selected and applied to the side of the valve spool opposite the spring. If the pressure in the supply line is higher than the pump pressure due to a load on the hydraulic device, then this higher pressure is transmitted through the shuttle valve to the second side of the valve spool, opposite the spring. The valve spool moves into the open position of the valve, against the spring force and the lower pressure applied to its first side, so that the pump output pressure is applied to the load sensing connection and the control increases the pump pressure. As soon as the pump pressure exceeds the pressure in the supply line, the shuttle valve again shifts to the pump output pressure.

In the application of a hydraulic device with a control valve closed in its neutral position, a check valve is preferably also provided in the supply line, which prevents a fluid return flow from the hydraulic device to the valve. Here the check valve is also used to secure a load at the hydraulic device and prevents an initial pressure drop in the hydraulic device, if the control valve is opened against a pressure from the load. Again, the check valve is appropriately bypassed by a throttled channel in order to make possible a gradual pressure decrease in the supply line and to transmit the pressure of the hydraulic device to the load sensing connection, in the case that the control valve is closed against a high pressure from the load and therefore the check valve is also blocked.

If the control valve is returned to its neutral position then the supply line is again blocked. Since the supply line is connected to the pump outlet through a channel containing an orifice, pressure is gradually equalized, so that the output pressure of the hydraulic pump is applied to both sides of the valve spool and the valve spool is moved to its closed position under the force of the spring. When the valve is closed the pressure applied to the load sensing connection of the hydraulic pump is bled off to the reservoir through a throttling restriction and the output pressure of the hydraulic pump decreases to the stand-by pressure.

The valve preferably controls a second passage through which the pump outlet can be connected to the supply line. This connecting passage that provides pressure and hydraulic fluid to the hydraulic device, is opened and closed simultaneously with the connection between the supply line and the load sensing connection. This connecting passage appropriately contains an adjustable throttling restriction, which can be formed by an adjustable rotary valve. This permits a control of the flow of the hydraulic fluid flowing from the hydraulic pump to the hydraulic device, when the valve is open, while maintaining the advantages of the load sensing system according to the invention. Furthermore in particular when a hydraulic device is used with a control valve that is closed in its center position, the pressure fall-off generated across the throttling restriction can be used to stabilize the system.

DETAILED DESCRIPTION

Figure 1:
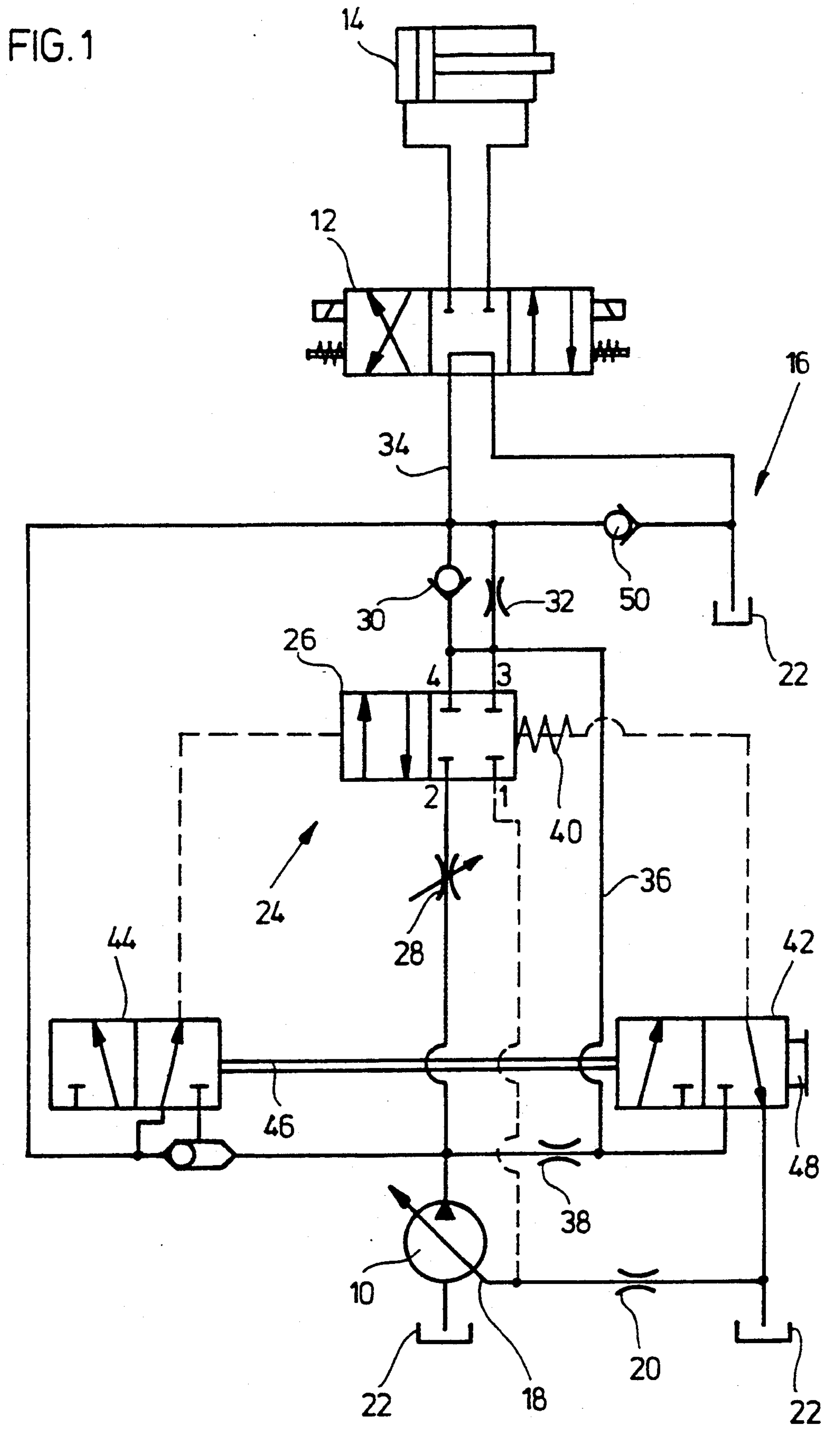
FIG. 1 is a schematic illustration of the present invention utilized in an open center hydraulic system.

FIG. 1 shows a hydraulic pump 10, a control valve 12 connected to a hydraulic cylinder 14 and a valve arrangement 16 connected between the hydraulic pump 10 and the control valve 12.

The hydraulic pump 10 is the hydraulic pump of a tractor, not shown, and is an adjustable pump whose output pressure is controlled as a function of the pressure applied to its load sensing port 18. The pump output pressure is thereby always, for example, 30 Bar above the load sensing pressure, as long as the system pressure of 200 Bar has not yet been reached. The load sensing port 18 is connected to a reservoir 22 through a throttling restriction 20. The load sensing pressure can gradually bleed off over this throttling restriction 20. If no load sensing pressure is present, the hydraulic pump 10 reduces its controlled pressure and produces, for example, a stand-by pressure of 30 Bar.

The valve arrangement 16 may be configured as a valve block that can be rigidly attached to the tractor with hydraulic connections. On the other hand, the control valve 12 and the hydraulic cylinder 14 may be component parts of an attached implement, not shown, that can be selectively coupled to the tractor. To establish the hydraulic connections, the inlets to the control valve 12 are connected by flexible lines and quick disconnect fittings, not shown, to corresponding hydraulic connections of the valve block. The control valve 12 of FIG. 1 is a 4/3-way valve whose one inlet is connected to the outlet of the valve arrangement 16 and whose other inlet is connected to the reservoir 22. In the central neutral position of the control valve 12 both its inlets are connected to each other, so that a constant-flow hydraulic circuit (closed-center-circuit) is formed. Switching of the control valve 12 permits the selective connection of the two cylinder chambers of the hydraulic cylinder 14 to the outlet pressure of the valve arrangement 16.

The core member of the valve arrangement 16 is a valve 24 by means of which two passages can be opened or closed. Fundamentally, these two valve operations could be performed by two separate valves. The use of only one valve spool 26 permits a simple and compact arrangement.

A first inlet 2 of the valve 24 is connected to the pump outlet through an adjustable throttling restriction 28 configured as a rotary valve, which controls the flow, while a second inlet 1 of the valve 24 is connected to the load sensing port 18 of the hydraulic pump 10. The two outlets 3 and 4 of the valve 24 which correspond to the inlets 1 and 2 are connected to each other. This combination is connected through a check valve 30 and a parallel throttling restriction 32 to a supply line 34, which connects the valve 16 to the control valve 12. Furthermore, the outlets 3 and 4 are connected through a channel 36 that contains an orifice 38 to the pump outlet.

The valve spool 26 of the valve 24 is loaded on one side by a spring 40, which forces the valve spool 26 into its closing position, in which both passages are blocked. In addition, each end of the valve spool 26 is subject to a control pressure which urges the valve spool 26 to the opposite position. The control connections of the valve 24 are each connected to a selector valve 42, 44. Each of the two selector valves is a 3/2-way valve. They are coupled to each other mechanically as indicated by the rod 46 and can be operated together in various ways (for example, electrically, hydraulically or mechanically) by an actuator 48. Most appropriately, the two selector valves 42, 44 are configured as a combined valve spool. They are shown as separate parts only for the sake of clarity.

The position of the selector valves 42, 44 shown in FIG. 1, corresponds to the open-center-operation in which a hydraulic device with its center position open and designed for constant-flow operation, is connected to the valve arrangement 16. In this position the control connection of the valve 24, located on the side of the spring 40, is connected to the reservoir 22, and the other control connection is connected to the supply line 34 leading to the control valve 12.

The hydraulic system shown in FIG. 1 operates as follows:

If the control valve 12 is in its neutral position, then the supply line 34 is connected to the reservoir 22 and does not carry any pressure. Thereby, the two control connections of the valve 24 are connected to the reservoir 22, so that the valve spool 26 is moved into its position shown in FIG. 1 by the force of the spring 40 and both passages are blocked. The hydraulic pump 10 does not deliver any hydraulic fluid to the hydraulic device 12, 14. In case that pressure still exists at the load sensing port 18, it is bled off over the throttling restriction 20 to the reservoir 22. The output of the hydraulic pump 10 is controlled down to its stand-by pressure.

If the control valve 12 is moved to an operating position, then the flow from the supply line 24 to the reservoir 22 is blocked. A constant control flow passes through the orifice 38 and the channel 36, by means of which a pressure in the supply line 34 is built up. This pressure is transmitted through the selector valve 44 to the control connection of the valve 24 opposite the spring 40 and moves the valve spool 26 to its open position, in which both passages are open. Now, the hydraulic pump 10 delivers hydraulic fluid through the throttling restriction 28, the valve 24, the check valve 30, the supply line 34 and the control valve 12 to the hydraulic cylinder 14 so that this performs the desired movement. Furthermore, the load sensing port 18 of the hydraulic pump 10 is connected to the pressure of the supply line 34, so that the output of the hydraulic pump 10 is brought up and it provides its maximum system pressure to supply the hydraulic device.

If the control valve 12 is again brought into its center position in order to interrupt the actuation of the hydraulic cylinder, then the pressure in the supply line 34 is removed, the valve 24 closes and the output of the hydraulic pump 10 is controlled down to its stand-by pressure.

If the control valve 12 is opened against a pressure due to load in the hydraulic cylinder 14, then the check valve 30 prevents a fall-off in the load. The throttling restriction 32 located parallel to the check valve 30 does, however, permit a leakage flow against the blocking action of the check valve 30, so that a gradual pressure equalization can occur. For the open-center application, however, this throttling restriction 32 is not necessary.

If the control valve 12 is opened against a negative pressure in the hydraulic cylinder 14, a check valve 50 is arranged between the supply line 34 and the reservoir 22, that permits a suction flow of hydraulic fluid, if necessary, from the reservoir 22.

Figure 2:
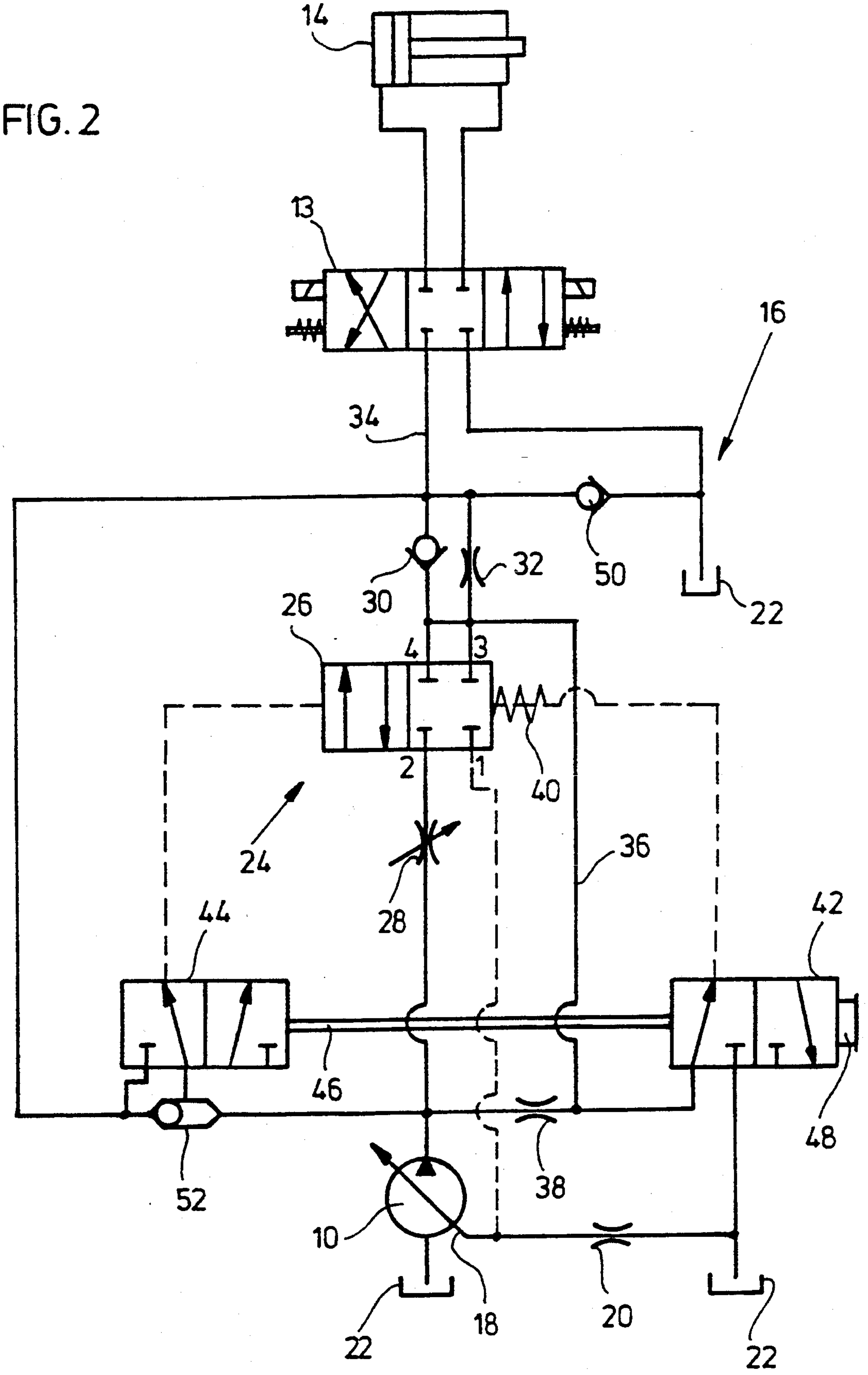
FIG. 2 is a schematic illustration of the present invention utilized in an closed center hydraulic system.

The hydraulic system shown in FIG. 2 is similar to that shown in FIG. 1. Accordingly, the same reference numbers are used for the same elements.

A significant difference of the two hydraulic systems can be seen in their application. The hydraulic system shown in FIG. 1 supplies a constant-flow hydraulic device, that contains an open-center control valve, whereas FIG. 2 shows a system supplying a constant-pressure hydraulic device with a closed-center control valve 13. Correspondingly, the selector valves 42, 44 shown in FIG. 2 are shown in their position for closed-center operation. Furthermore, a shuttle valve 52 is arranged between the pump outlet and the supply line 34, whose center connection can be connected through the selector valve 44 to the control connection of the valve 24 which is opposite to the spring 40. This shuttle valve 52 is shown in FIG. 1, but has not yet been described since it has no significance to the open-center operation.

The hydraulic system shown in FIG. 2 operates as follows:

If the control valve 13 is in its neutral position, then the supply line 34 is blocked. The pump output pressure is applied, and is transmitted through the orifice 38, the channel 36 and the orifice 32 or the check valve 30. The pump output pressure is also transmitted through the orifice 38 and the selector valve 42 or through the shuttle valve 52 and the selector valve 44 to both of the control connections of the valve 24. Therefore, the valve spool 26 of the valve 24 is retained in its closed position as shown by the force of the spring 40, in which position both passages are blocked. If any remaining pressure exists at the load sensing port 18, this is bled off over the throttling restriction 20 to the reservoir 22. The output of the hydraulic pump 10 is controlled down to the stand-by pressure.

If the control valve 13 is moved to an operating position, then the pressure in the supply line 34 falls off and the pressure in the control connection of the valve 24 located on the side of the spring 40 is bled off through the channel 36 and the selector valve 42. The valve spool 26 is moved into its open position by the pump output pressure applied to the other control connection, in which position a free flow path is provided from the hydraulic pump 10 to the control valve 13. Furthermore, the pressure in the supply line 34 is transmitted to the load sensing port 18 so that the load signal required for the control of the pump is provided and the output pressure of the hydraulic pump 10 is brought up. The pressure drop through the adjustable throttling restriction 28 provides stabilization to the system.

When the control valve 13 is returned to its center position the supply line 34 is again blocked. Pressure equalization occurs over the orifice 38. Thereby, the same pressure is again transmitted to both control connections of the valve 34, that is, the pump output pressure and the valve spool 26 of the valve 24 is moved to its closed position by the force of the spring 40.

If the pressure in the supply line 34 is higher than the pump output pressure due to a load on the hydraulic cylinder 14, then the pressure in the supply line 34 moves the shuttle valve 52 out of the position shown, so that the supply line 34 is connected over the shuttle valve 52 and the selector valve 44 to the control connection of the valve 24 on the side opposite the spring 40. The shuttle valve 52 assures that the higher of the pressures at the pump outlet or in the supply line is transmitted to the control connection. Therefore, the valve 24 also opens when the pressure in the hydraulic cylinder 14 is higher than the pump output pressure during the movement of the control valve 13 into its operating position. Here too the check valve 30 is used to secure the load that is applied to the hydraulic cylinder 14. The throttling restriction 32 permits the pressure in the supply line 34 to bleed off in the case that the control valve 13 is closed against a high pressure from the load. As a rule, the passage opening of the throttling restriction 32 is held to a smaller cross section than that of the orifice 38, so that the pressure at the control connection of the valve 24 on the side of the spring is primarily influenced by the pump output pressure.

Figure 3:
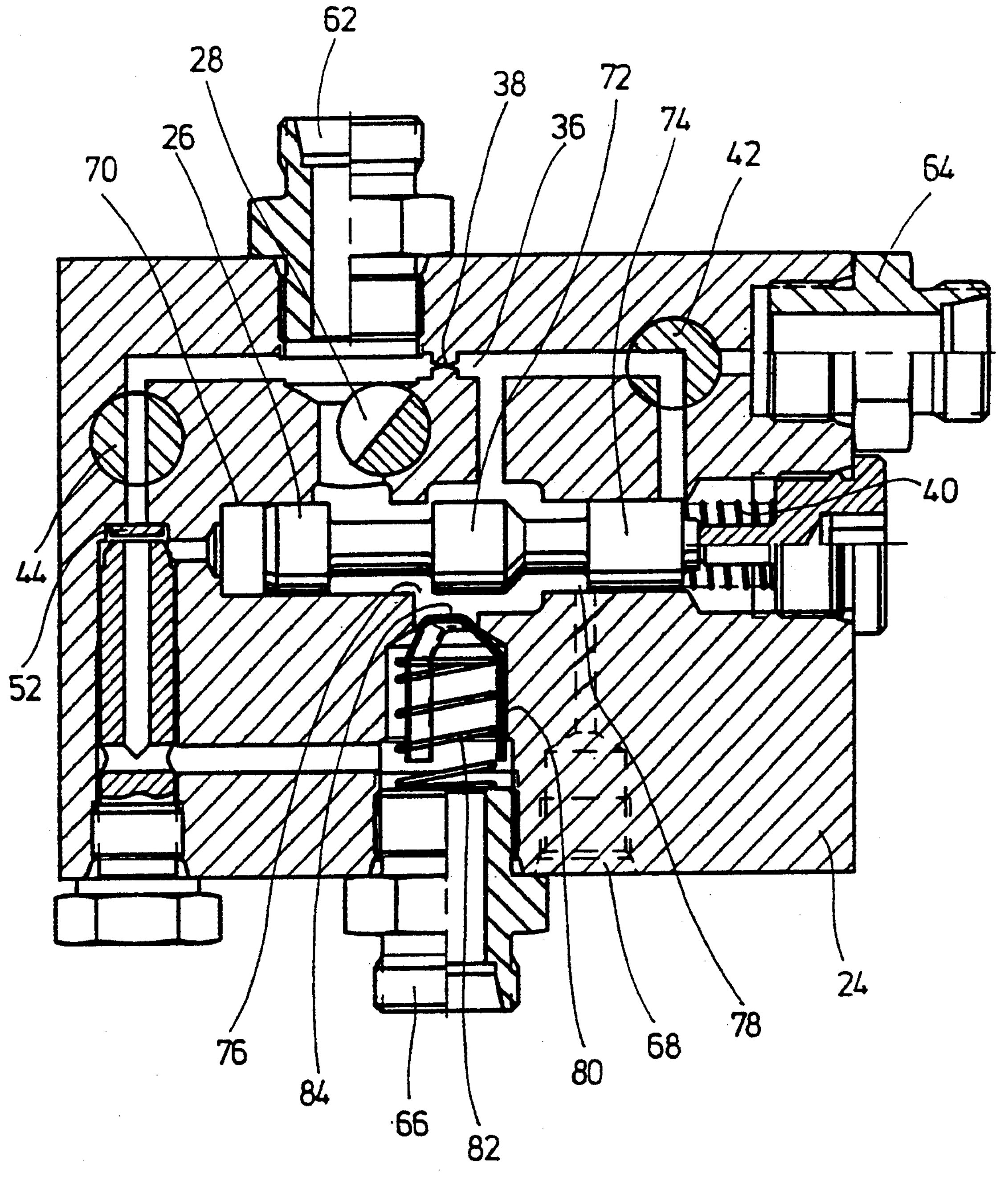
FIG. 3 is a cross sectional view of a valve arrangement according to the present invention which is to be connected between a hydraulic pump and a hydraulic device.

Referring now to FIG. 3, the valve block 60 contains essentially all the components of the valve arrangement 16 shown in FIGS. 1 and 2. The valve block 60 contains a pump connection 62 that can be connected to a hydraulic pump 10, a tank connection 64 that can be connected to the reservoir 22, an operating connection 66 that can be connected over a supply line 34 to a hydraulic device and a sensing connection 68 that can be connected to the load sensing port 18 of the hydraulic pump 10. A bore 70 of the valve block 60 contains a valve spool 26 that can slide easily and that is provided with two control sections 72, 74 and is forced by a spring 40 into its left position as seen in FIG. 3. The first control section 72 opens or closes a passage 76 between the pump connection 62 and the operating connection 66, while the second control section 74 opens or closes a passage 78 between a channel 36 and the sensing connection 68. The valve spool 26 is shown in its right-most position in which both passages 76, 78 are open.

The right end face of the valve spool 26 is connected to a selector valve 42 by means of which it can be selectively connected to the tank connection 64 or over a channel 36 containing an orifice 38 to the pump connection 62. The left end face of the valve spool 26 can be selectively connected by a shuttle valve. 52 to the operating connection 66 or through a reversing valve 44 to the pump connection 62. The shuttle valve 52 is so designed that it transmits the higher of the two pressures at either the operating connection 66 or the pump connection 62 to the left end face of the valve spool 26. The two selector valves 42, 44 are shown in their closed-center position. By rotating them they can be brought to their open-center position.

It should be emphasized that besides the selector valves 42, 44 other means can be applied to switch between constant-pressure operation and constant-flow operation. For example, simple plugs can be used to close the channels that are not required or interfere with the particular mode of operation.

A valve insert 80 is inserted into the bore of the operating connection 66, and is forced by a spring 82 against an outlet opening, in order to close it. This valve insert 80 forms the check valve 30. It has a central bore 84 which acts as throttling restriction 32 and permits a gradual pressure equalization.

In the region of the pump connection 62 a throttling restriction 28 is provided in the form of a rotary valve. The throttling restriction 28 provides an adjustable pressure drop, on the one hand, so that the load sensing signal is smaller by a specific amount, for example, 30 Bar, than the pump output pressure. On the other hand, the throttling restriction 28 can be used to control the flow.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. In an open centered hydraulic system having a reservoir (22), a hydraulic device, an adjustable hydraulic pump for supplying hydraulic fluid to the hydraulic device via a supply line, the pump having an output pressure which is controlled as a function of a pressure detected at a load sensing port (18), and a valve circuit connected between the pump, reservoir and the device, characterized by:

a valve connected between the supply line and the load sensing port, the valve having a pressure responsive valve spool, the valve spool being movable to a closed position wherein communication between the supply line and the load sensing port is closed in response to pressure applied to a first end thereof, the valve spool being movable to an open position wherein communication between the supply line and the load sensing port is open in response to pressure applied to a second end thereof, the valve also having a spring which engages the first end and which urges the valve spool towards the closed position; and the first end of the valve spool is exposed to reservoir pressure, and the second end of the valve spool is exposed to supply line pressure.

2. The hydraulic system of claim 1, wherein:

an outlet of the pump is communicated to the supply line via a channel which includes an orifice.

3. The hydraulic system of claim 1 wherein:

in its open position the valve opens communication between an outlet of the pump and the supply line, and in its closed position closes communication between the pump outlet and the supply line.

4. The hydraulic system of claim 3, wherein:

an adjustable throttling restriction is connected between the pump outlet and the supply line.

5. The hydraulic system of claim 1, further comprising:

a check valve is connected between an outlet of the valve and the supply line, the check valve permitting one way fluid flow from the valve to the supply line.

6. The hydraulic system of claim 5, further comprising:

a bypass line which bypasses the check valve, the bypasses line including a throttling restriction.

7. The hydraulic system of claim 1, further comprising:

a check valve connected between the supply line and the reservoir which permits one way fluid flow from the reservoir to the supply line.

8. In a closed centered hydraulic system having a reservoir (22), a hydraulic device, an adjustable hydraulic pump for supplying hydraulic fluid to the hydraulic device via a supply line, the pump having an output pressure which is controlled as a function of a pressure detected at a load sensing port (18), and a valve circuit connected between the pump, reservoir and the device, characterized by:

a valve connected between the supply line and the load sensing port, the valve having a pressure responsive valve spool, the valve spool being movable to a closed position wherein communication between the supply line and the load sensing port is closed in response to pressure applied to a first end thereof, the valve spool being movable to an open position wherein communication between the supply line and the load sensing port is open in response to pressure applied to a second end thereof, the valve also having a spring which engages the first end and which urges the valve spool towards the closed position; and the first end of the valve spool is exposed to supply line pressure, and the second end of the valve spool is exposed to pump pressure.

9. The hydraulic system of claim 8, further comprising:

control means for controlling the pressures applied to the first and the second ends of the valve spool.

10. In an open centered hydraulic system having a reservoir (22), a hydraulic device, an adjustable hydraulic pump for supplying hydraulic fluid to the hydraulic device via a supply line, the pump having an output pressure which is controlled as a function of a pressure detected at a load sensing port (18), and a valve circuit connected between the pump, reservoir and the device, characterized by:

a valve connected between the supply line and the load sensing port, the valve having a pressure responsive valve spool, the valve spool being movable to a closed position wherein communication between the supply line and the load sensing port is closed in response to pressure applied to a first end thereof, the valve spool being movable to an open position wherein communication between the supply line and the load sensing port is open in response to pressure applied to a second end thereof, the valve also having a spring which engages the first end and which urges the valve spool towards the closed position; and control means for controlling the pressures applied to the first and the second ends of the valve spool, the control means connecting the first end of the valve spool to the reservoir and connecting the second end of the valve spool to the supply line.

11. In a closed centered hydraulic system having a reservoir (22), a hydraulic device, an adjustable hydraulic pump for supplying hydraulic fluid to the hydraulic device via a supply line, the pump having an output pressure which is controlled as a function of a pressure detected at a load sensing port (18), and a valve circuit connected between the pump, reservoir and the device, characterized by:

a valve connected between the supply line and the load sensing port, the valve having a pressure responsive valve spool, the valve spool being movable to a closed position wherein communication between the supply line and the load sensing port is closed in response to pressure applied to a first end thereof, the valve spool being movable to an open position wherein communication between the supply line and the load sensing port is open in response to pressure applied to a second end thereof, the valve also having a spring which engages the first end and which urges the valve spool towards the closed position; and control means for controlling the pressures applied to the first and the second ends of the valve spool, the control means connecting the first end of the valve spool to the supply line and connecting the second end of the valve spool to the pump outlet or the supply line, whichever has a higher pressure.

12. In a hydraulic system having a reservoir (22), a hydraulic device, an adjustable hydraulic pump for supplying hydraulic fluid to the hydraulic device via a supply line, the pump having an output pressure which is controlled as a function of a pressure detected at a load sensing port (18), and a valve circuit connected between the pump, reservoir and the device, characterized by:

a valve connected between the supply line and the load sensing port, the valve having a pressure responsive valve spool, the valve spool being movable to a closed position wherein communication between the supply line and the load sensing port is closed in response to pressure applied to a first end thereof, the valve spool being movable to an open position wherein communication between the supply line and the load sensing port is open in response to pressure applied to a second end thereof, the valve also having a spring which engages the first end and which urges the valve spool towards the closed position;

control means for controlling the pressures applied to the first and the second ends of the valve spool; and a shuttle valve which supplies to an inlet of the control means a pressure which is the greater of the pump pressure and the pressure of the supply line.

13. In a hydraulic system having a reservoir (22), a hydraulic device, an adjustable hydraulic pump for supplying hydraulic fluid to the hydraulic device via a supply line, the pump having an output pressure which is controlled as a function of a pressure detected at a load sensing port (18), and a valve circuit connected between the pump, reservoir and the device, characterized by:

a valve connected between the supply line and the load sensing port, the valve having a pressure responsive valve spool, the valve spool being movable to a closed position wherein communication between the supply line and the load sensing port is closed in response to pressure applied to a first end thereof, the valve spool being movable to an open position wherein communication between the supply line and the load sensing port is open in response to pressure applied to a second end thereof, the valve also having a spring which engages the first end and which urges the valve spool towards the closed position;

a check valve connected between an outlet of the valve and the supply line, the check valve permitting one way fluid flow from the valve to the supply line; and a bypass line which bypasses the check valve, the bypass line including a throttling restriction.

* * * * *